United States Patent
Kuo et al.

(10) Patent No.: US 8,248,818 B2
(45) Date of Patent: Aug. 21, 2012

(54) BRACKET AND ELECTRONIC DEVICE UTILIZING THE BRACKET

(75) Inventors: Che-Yu Kuo, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 239 days.

(21) Appl. No.: 12/723,707

(22) Filed: Mar. 15, 2010

(65) Prior Publication Data
US 2011/0128710 A1    Jun. 2, 2011

(30) Foreign Application Priority Data
Dec. 1, 2009   (CN) .......................... 2009 2 0316341

(51) Int. Cl.
*H05K 7/14* (2006.01)
*H05K 7/18* (2006.01)

(52) U.S. Cl. .......................... 361/802; 361/755; 361/803

(58) Field of Classification Search .................. 361/755, 361/800–803, 807, 810, 732, 747, 759; 312/223.1, 312/223.2
See application file for complete search history.

(56) References Cited

U.S. PATENT DOCUMENTS

| | | | | |
|---|---|---|---|---|
| 4,550,362 A * | 10/1985 | Reimer | .......................... | 361/801 |
| 5,191,514 A * | 3/1993 | Kabat et al. | .................... | 361/802 |
| 5,594,627 A * | 1/1997 | Le | ................... | 361/801 |
| 5,914,854 A * | 6/1999 | Holt | ......................... | 361/679.23 |
| 6,181,565 B1 * | 1/2001 | Schmitt et al. | ................. | 361/756 |
| 6,304,452 B1 * | 10/2001 | Lo | ................... | 361/704 |
| 6,881,089 B1 * | 4/2005 | Yang | ............................ | 439/377 |

* cited by examiner

*Primary Examiner* — Hung S Bui
(74) *Attorney, Agent, or Firm* — Altis Law Group, Inc.

(57) ABSTRACT

A bracket is used for retaining an expansion card. The expansion card includes a printed circuit board (PCB) and a slot cover attached to the PCB. The bracket includes a back wall, a retaining wall, and a retainer. The back wall defines at least one expansion slot corresponding to the slot cover. The retaining wall is opposite to the sidewall. The retainer is attached to the retaining wall. The retainer includes an elongated body, a first retaining wall, and a second retaining wall substantially parallel to the first retaining wall. A sliding channel is defined between the first retaining wall and the second retaining wall. An edge of the PCB is capable of being slid and retained in the sliding channel.

8 Claims, 4 Drawing Sheets

BRACKET AND ELECTRONIC DEVICE UTILIZING THE BRACKET

BACKGROUND

1. Technical Field

The present disclosure relates to expansion devices, and more particularly to a bracket for mounting expansion cards and an electronic device utilizing the bracket.

2. Description of Related Art

An expansion card for an electronic device is a printed circuit board that can be inserted into an expansion slot of the motherboard of the electronic device to add additional functionality to the system. Most expansion cards are secured to the case with screws. To install and uninstall an expansion card is time-consuming and troublesome because the securing screw must be screwed and unscrewed with a screwdriver. In addition, the screw may fall on the motherboard and may even be "lost" among the components of the motherboard. If a screw is lost in the electronic device, short-circuit may occur when the electronic device is powered up.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
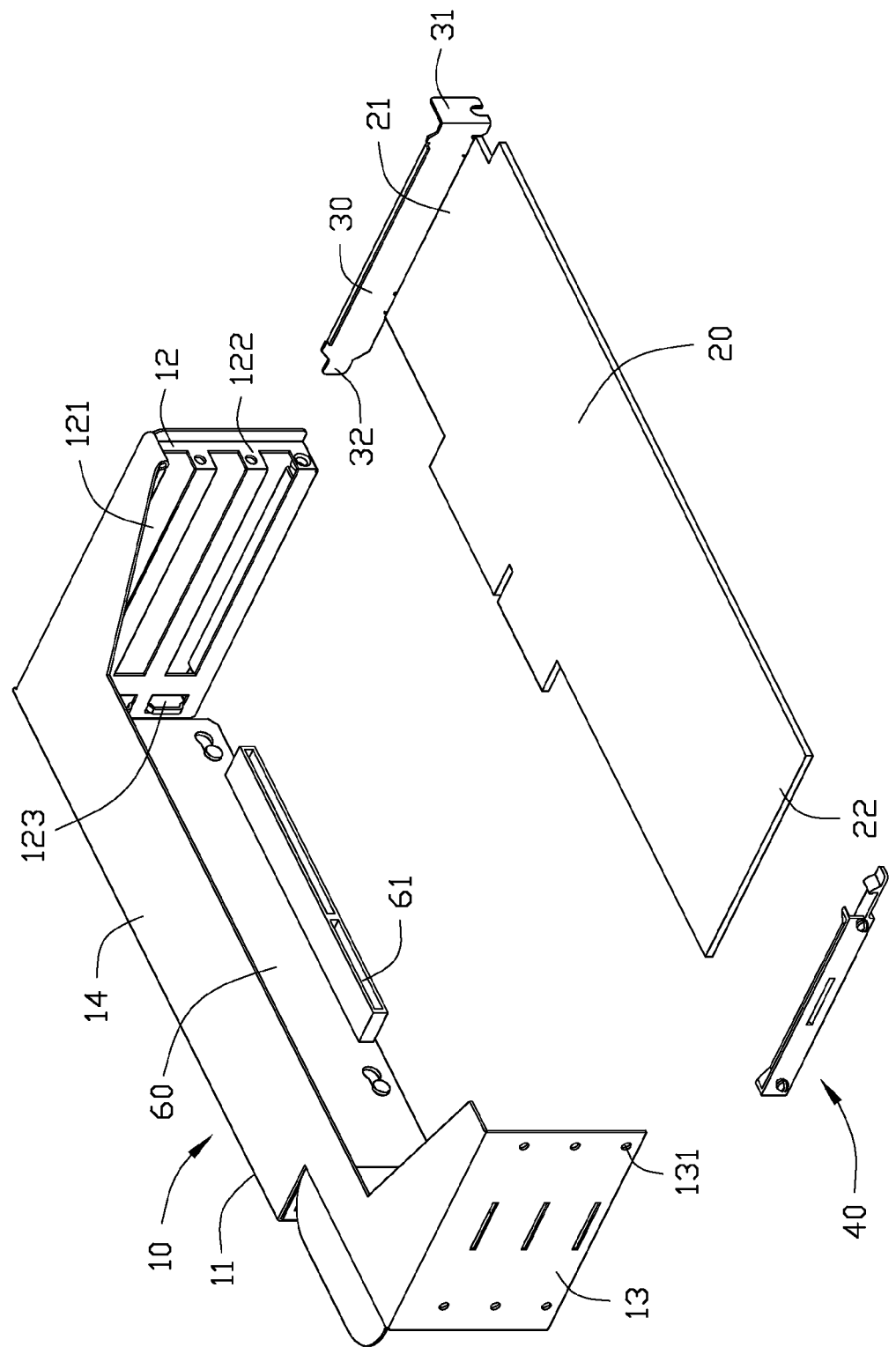
FIG. 1 is an exploded, isometric view of an embodiment of an electronic device as disclosed.

Referring to FIG. 1, an embodiment of an electronic device as disclosed includes a bracket 10, a motherboard 60 located in the bracket 10 and an expansion card 20. The motherboard 60 has a plurality of connectors 61 for connecting the expansion cards 20.

The expansion card 20 can include a printed circuit board (PCB) 21 and a slot cover 30 mounted to the PCB 21. The slot cover 30 includes a bent clip 31 and a reduced end portion 32. The PCB 21 includes an edge 22 opposite to the slot cover 30.

The bracket 10 includes a sidewall 11, a top wall 14, a back wall 12, a retaining wall 13 and a retainer 40 attached to the retaining wall 13. The sidewall 11 is perpendicular to the retaining wall 13 and the back wall 12. The retaining wall 13 parallels the back wall 12. The back wall 12 defines a plurality of parallel expansion slots 121. The back wall 12 includes at least one bridge portion 123 that receives the end portion 32 of slot cover 30. A mounting flange 122 is perpendicular to the back wall 12. The expansion slots 121 reach the mounting flange 122. The retaining wall 13 defines at least one through hole 131.

Figure 2:
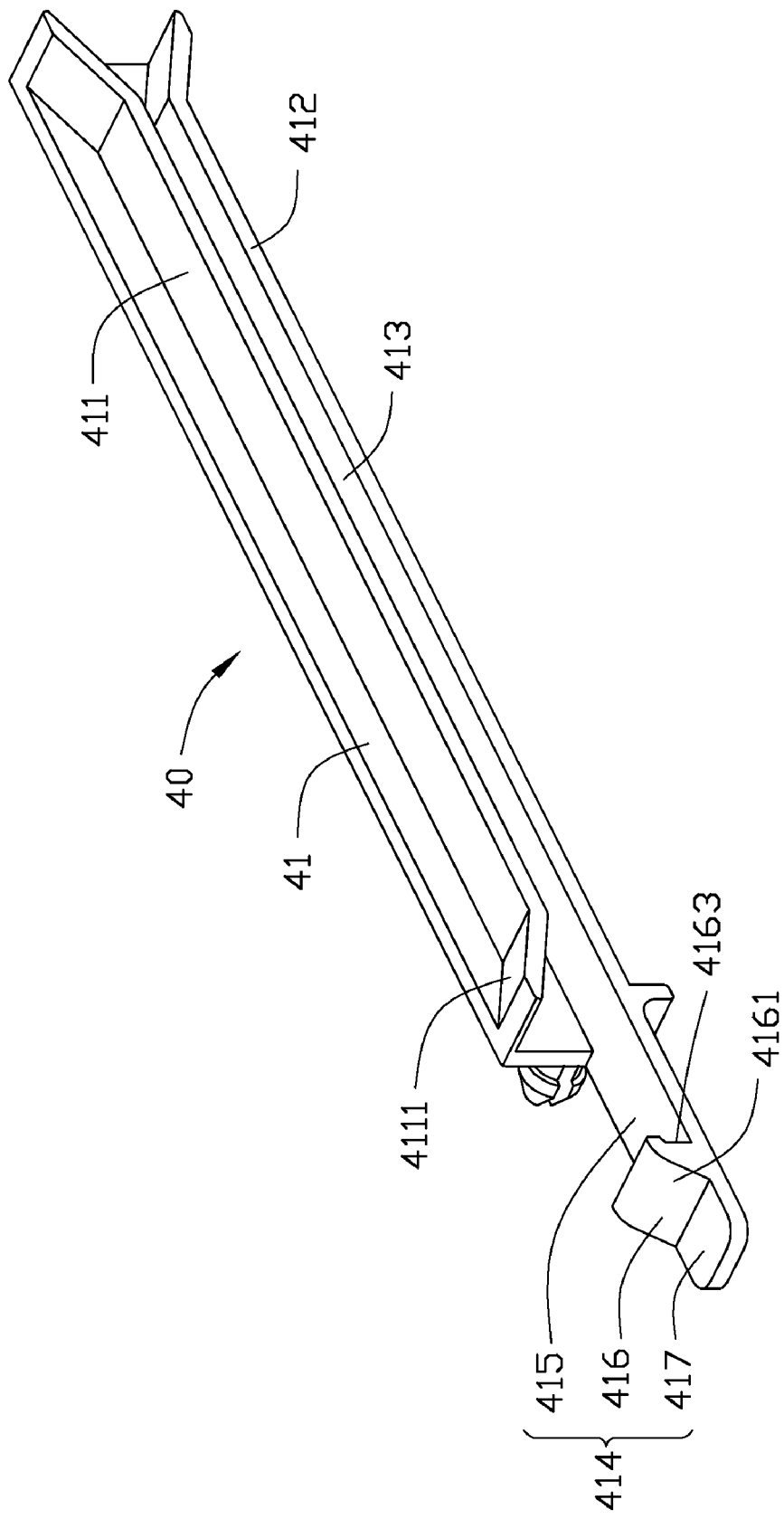
FIG. 2 is an isometric view of a retainer of the electronic device.
Figure 3:
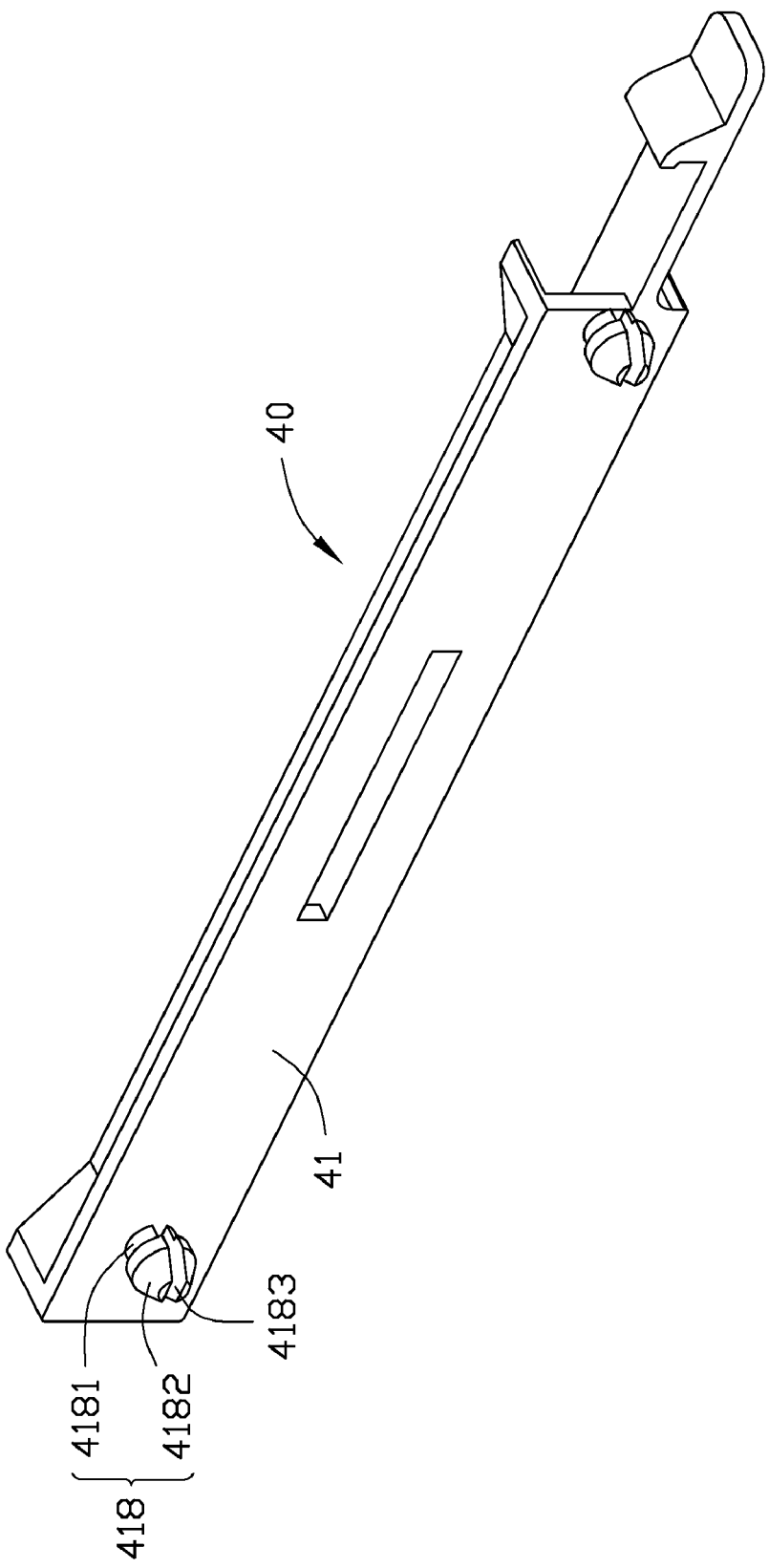
FIG. 3 is similar to FIG. 2, but shown in another aspect.

Referring to FIG. 2 and FIG. 3, the retainer 40 includes an elongated body 41, a first retainer wall 411 and a second retaining wall 412 substantially parallel to the first retaining wall 411. A sliding channel 413 is defined between the first retaining wall 411 and the second retaining wall 412. An oblique guide portion 4111 is formed on the first retaining wall 411 for facilitating guiding the edge 22 of the PCB 21. A resilient securing portion 414 is formed on the second retaining wall 412 for movably retaining the PCB 21. The securing portion 414 includes a resilient arm 415 extending from the second retaining wall 412, a protrusion 416 protrudes from the arm 415 for blocking the PCB 21 and a tab 417 formed on a distal end of the arm 415. The protrusion 416 includes an oblique surface 4161 opposite to the sliding channel 413 and an L-shaped securing surface 4163. At least one post 418 protrudes from the body 41 corresponding to the at least one through hole 131. Each post 418 is divided into two resilient parts. Each part includes a head portion 4182 and a neck portion 4181. A slit 4183 is defined between the two resilient parts.

Figure 4:
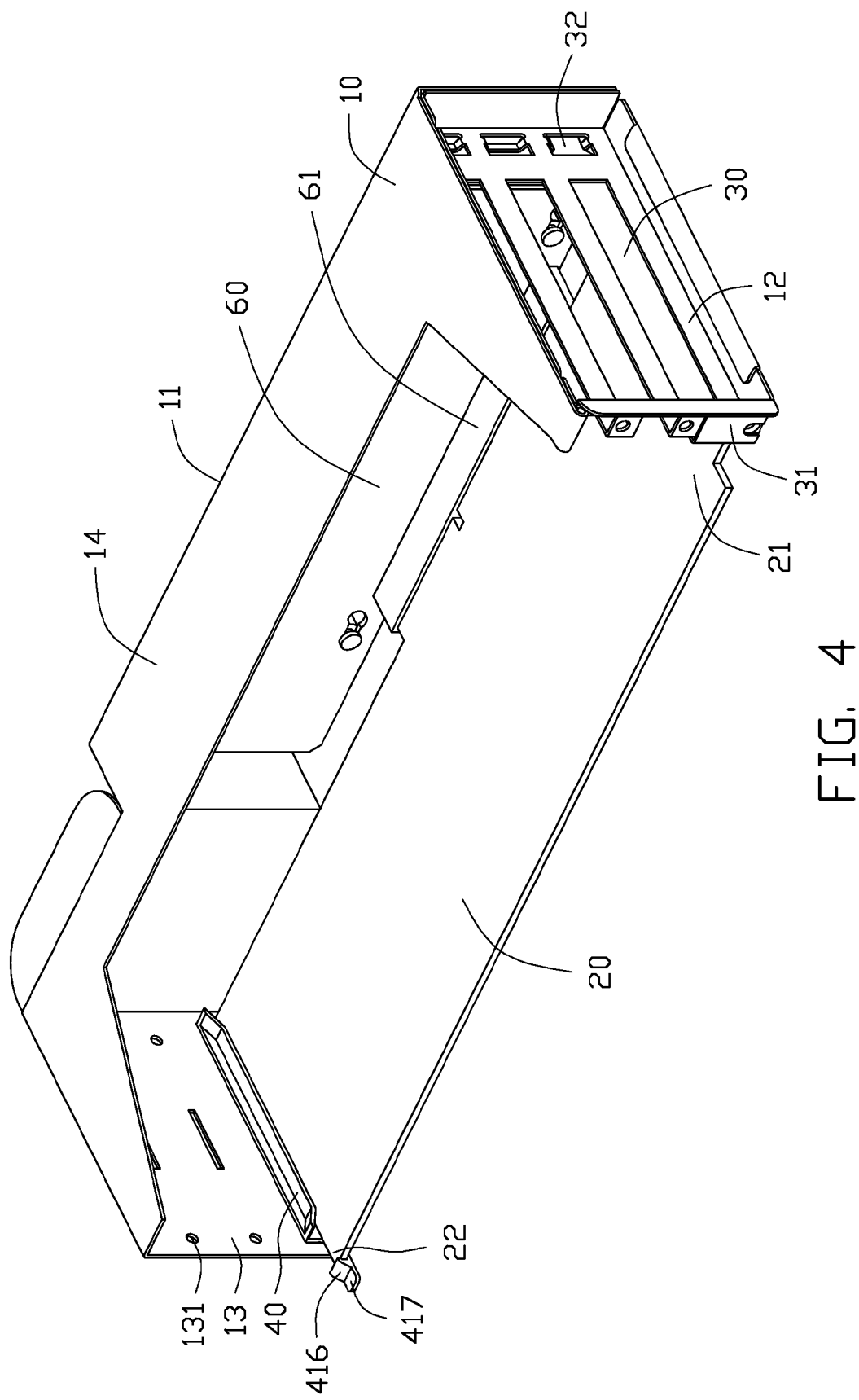
FIG. 4 is an assembled view of the electronic device.

Referring to FIG. 4, during assembly of the bracket 10, the motherboard 60 is mounted to the sidewall 11. The retainer 40 is secured to the retaining wall 13 with each post 418 received in the corresponding through hole 131.

During mounting of the expansion card 20, the PCB 21 is received in the connector 60, and the end portion 32 is received in the bridge portion 123. The slot cover 30 covers one of the expansion slots 121. The bent clip 31 covers the mounting flange 122. The edge 22 of the expansion card 20 abuts the oblique surface 4161 to bias the protrusion 416 and slides into the slide way 413. When the expansion card 21 reaches the sidewall 11, the arm 415 deforms back and the protrusion 416 secures the expansion card 21. The PCB 20 is engaged with the connector 61.

When removing the expansion card 20, the tab 417 is pressed down to cause the protrusion 416 to disengage from the PCB 21, the expansion card can then be removed.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
    an expansion card comprising a printed circuit board (PCB) and a slot cover attached to the PCB;
    a bracket for securing the expansion card, the bracket comprising:
    a back wall, the back wall defining at least one expansion slot corresponding to the slot cover; and
    a retaining wall opposite to the sidewall; and
    a retainer attached to the retaining wall, the retainer comprising an elongated body, a first retaining wall, a second retaining wall, and a resilient securing portion; the first retaining wall and the second retaining wall are substantially parallel to the first retaining wall, a sliding channel defined between the first retaining wall and the second retaining wall, the securing portion comprising a resilient arm, extending from the second retaining wall, and a protrusion protruding from the resilient arm for blocking the PCB;

wherein the resilient arm is pressed from an original state by the PCB when the PCB is sliding into the sliding channel and rebounds back to the original state when the PCB is retained in the sliding channel.

2. The electronic device of claim 1, wherein an oblique guide portion is formed on the first retaining wall for facilitating guiding the PCB.

3. The electronic device of claim 1, wherein the protrusion comprises an oblique surface opposite to the sliding channel.

4. The electronic device of claim 1, wherein the protrusion comprises an L-shaped securing surface for retaining the PCB.

5. The electronic device of claim 1, wherein the securing portion further comprises a tab at a distal end of the arm.

6. The electronic device of claim 1, wherein the retaining wall defines at least one through hole, and the retainer comprises at least one post corresponding to the at least one through hole.

7. The electronic device of claim 6, wherein each post is divided into two resilient parts, a slit is defined between the two resilient parts.

8. The electronic device of claim 6, wherein each resilient part comprises a neck portion and a head portion.

* * * * *